No. 751,724.

Patented February 9, 1904.

UNITED STATES PATENT OFFICE.

MAX ENGELMANN, OF ELBERFELD, GERMANY, ASSIGNOR TO FARBENFABRIKEN OF ELBERFELD CO., OF NEW YORK, N. Y., A CORPORATION OF NEW YORK.

PROCESS OF MAKING DIALKYL-BARBITURIC ACID.

SPECIFICATION forming part of Letters Patent No. 751,724, dated February 9, 1904.

Application filed November 3, 1903. Serial No. 179,693. (No specimens.)

*To all whom it may concern:*

Be it known that I, MAX ENGELMANN, doctor of philosophy, chemist, residing at Elberfeld, Germany, (assignor to the FARBENFABRIKEN OF ELBERFELD Co., of New York,) have invented a new and useful Improvement in Processes of Preparing Dialkyl - Barbituric Acids; and I do hereby declare the following to be an exact and clear description of my invention.

My invention relates to a new process for the production of dialkyl-barbituric acids (dialkyl-2-4-6-trioxypyrimidins) having the following general formula:

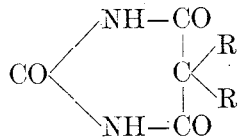

(R meaning alkyl radicals,) which bodies possess valuable therapeutic, especially soporific, properties. The process for the preparation of these compounds consists in first condensing thio-urea (thio-carbamid) and dialkyl-cyano-acetic esters of the general formula:

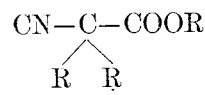

by means of alkali alcoholates; secondly, splitting off the imino group in 4-position from the resulting 5-dialkylated-2-thio-4-imino-6-oxypyrimidins of the general formula:

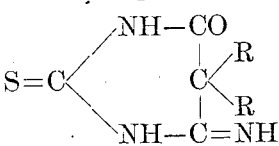

by treatment with acids, and, finally, desulfurizing the 5-dialkyl-2-thio-4-6-dioxypyrimidins thus produced by treatment with oxidizing agents, by which operation the sulfur is replaced by oxygen.

In order to carry out my process practically, I can, for instance, proceed as follows: Seventy-six parts of thio-urea and one hundred and seventy parts of diethyl-cyano-acetic ethylic ester are added to a solution of twenty-three parts of sodium in three hundred parts of alcohol, and the resulting mixture is heated for six hours on the water-bath. The alcohol is distilled off, and the resulting sodium salt of the new compound is decomposed by means of dilute acetic acid. After a recrystallization from hot water the new body is obtained in the shape of yellowish needles, melting at 256° centigrade. For the saponification fifty parts of the 2-thio-4-imino-5-diethyl-6-oxypyrimidin thus produced are heated with one hundred parts of a thirty-percent. sulfuric acid for three hours on the water-bath. After cooling it is filtered off, and twenty parts of the 2-thio-4-6-dioxy-5-diethylpyrimidin thus obtained are introduced into fifty parts of pure concentrated nitric acid. The oxidation is completed in a short time. The excess of nitric acid is then neutralized by the addition of sodium carbonate, and the diethyl barbituric acid thus precipitated is purified by a recrystallization from water. The saponification and the splitting off of sulfur can also be carried out with other acids or other oxidizing agents.

The process proceeds in an analogous manner for the production of other dialkyl barbituric acids.

Having now described my invention and in what manner the same is to be performed, what I claim as new, and desire to secure by Letters Patent, is—

1. The process for the production of dialkyl-barbituric acids having the above-given general formula, which process consists in first condensing thio-urea and dialkyl-cyano acetic esters by means of alcoholates of alkalies, secondly splitting off the imino group in 4-position from the resulting 5-dialkyl-2-thio-4-imino-6-oxypyrimidins by treatment with acids, and finally desulfurizing the 5-dialkyl-2-thio-4-6-dioxypyrimidins thus produced, substantially as hereinbefore described.

2. The process for the production of diethyl-barbituric acid, which process consists in first condensing thio-urea and diethyl-cyano acetic ester by means of alcoholates of alkalies, secondly splitting off the imino group in 4-position from the resulting 5-diethyl-2-thio-4-imino-6-oxypyrimidin by treatment with acids, and finally desulfurizing the resulting 5-diethyl-2-thio-4-6-dioxypyrimidin by treatment with oxidizing agents, substantially as hereinbefore described.

3. The process for the production of diethyl-barbituric acid, which process consists in first condensing thio-urea and the ethylic ester of diethyl-cyano-acetic acid by means of sodium ethylate, secondly splitting off the imino group in 4-position from the resulting 5-diethyl-2-thio-4-imino-6-oxypyrimidin by treatment with hot sulfuric acid and finally desulfurizing the resulting 5-diethyl-2-thio-4-6-dioxypyrimidin by treatment with nitric acid, substantially as hereinbefore described.

In testimony whereof I have signed my name in the presence of two subscribing witnesses.

MAX ENGELMANN.

Witnesses:
OTTO KÖNIG,
J. A. RITTERSHAUS.